US012798201B2

(12) United States Patent
Emel

(10) Patent No.: US 12,798,201 B2
(45) Date of Patent: Nov. 17, 2026

(54) PRODUCTION SYSTEM

(71) Applicant: Tusas—Turk Havacilik Ve Uzay Sanayii Anonim Sirketi, Ankara (TR)

(72) Inventor: Osman Oner Emel, Ankara (TR)

(73) Assignee: Tusas—Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 64 days.

(21) Appl. No.: 18/724,708

(22) PCT Filed: Nov. 2, 2022

(86) PCT No.: PCT/TR2022/051226

§ 371 (c)(1),
(2) Date: Jun. 27, 2024

(87) PCT Pub. No.: WO2023/129002

PCT Pub. Date: Jul. 6, 2023

(65) Prior Publication Data

US 2025/0074017 A1 Mar. 6, 2025

(30) Foreign Application Priority Data

Dec. 27, 2021 (TR) ............................... 2021/021194

(51) Int. Cl.

| | |
|---|---|
| ***B29C 70/34*** | (2006.01) |
| ***B29C 33/38*** | (2006.01) |
| ***B29C 33/40*** | (2006.01) |
| ***B29C 33/44*** | (2006.01) |
| ***B29C 70/30*** | (2006.01) |
| ***B29C 70/54*** | (2006.01) |
| ***B29L 31/30*** | (2006.01) |
| ***B33Y 80/00*** | (2015.01) |

(52) U.S. Cl.
CPC ........ *B29C 70/342* (2013.01); *B29C 33/3842* (2013.01); *B29C 33/40* (2013.01);
(Continued)

(58) Field of Classification Search
CPC ....... B29C 70/44; B29C 70/446; B29C 70/54; B29C 70/544; B29C 70/302;
(Continued)

(56) References Cited

U.S. PATENT DOCUMENTS 5,266,249 A * 11/1993 Grimes, III ............. B29C 70/44
428/116
5,683,646 A * 11/1997 Reiling, Jr. ........... B29C 70/549
264/225
(Continued)

FOREIGN PATENT DOCUMENTS

| | | |
|---|---|---|
| CN | 108527732 | 9/2018 |
| EP | 1101783 | 5/2001 |

(Continued)

OTHER PUBLICATIONS

International Search Report and the Written Opinion Dated Jul. 11, 2023 From the International Searching Authority Re. Application No. PCT/TR2022/051226. (7 Pages).

*Primary Examiner* — Nahida Sultana

(57) ABSTRACT

The present invention relates to at least one mold (2) produced by additive manufacturing method; at least one layer (3) (laminated) of resin-impregnated fabrics laid on an outer wall surface of the mold (2); at least one vacuum bag (4) which is placed to substantially cover the layer (3) and allows vacuuming; at least one furnace (5) which enables the layer (3) to be cured by heating, applies pressure to the layer (3) at a pressure value predetermined by the user, and into which the mold (2) is placed; at least one part (6) formed by curing the layers (3).

12 Claims, 3 Drawing Sheets

(52) U.S. Cl.
CPC .......... *B29C 33/448* (2013.01); *B29C 70/302* (2021.05); *B29C 70/545* (2013.01); *B33Y 80/00* (2014.12); *B29C 2793/009* (2013.01); *B29K 2879/085* (2013.01); *B29K 2995/0089* (2013.01); *B29L 2031/3076* (2013.01); *B29L 2031/3097* (2013.01)

(58) Field of Classification Search
CPC . B29C 70/342; B29C 70/545; B29C 33/3842; B29C 33/40; B29C 33/448; B29C 2793/009; B29C 2791/006; B33Y 80/00; B29K 2879/085; B29K 2995/0089; B29L 2031/3076; B29L 2031/3097
See application file for complete search history.

(56) References Cited

U.S. PATENT DOCUMENTS

| | | | | |
|---|---|---|---|---|
| 7,754,046 | B2 * | 7/2010 | Bottacin | B29C 65/48 52/745.18 |
| 8,585,856 | B1 * | 11/2013 | Boone | B29C 70/44 156/286 |
| 9,458,955 | B2 | 10/2016 | Hammer et al. | |
| 9,511,519 | B2 * | 12/2016 | Louie | B32B 37/10 |
| 11,034,431 | B2 * | 6/2021 | Stawski | B29C 66/73752 |
| 2009/0026315 | A1 * | 1/2009 | Edelmann | B64C 1/065 244/119 |
| 2012/0255669 | A1 * | 10/2012 | Catsman | B29C 70/443 156/189 |
| 2015/0174836 | A1 * | 6/2015 | Yoshida | B29C 35/0288 264/40.1 |
| 2019/0118420 | A1 * | 4/2019 | Hirabayashi | B29D 99/0014 |
| 2020/0031087 | A1 * | 1/2020 | Miura | B32B 15/08 |
| 2020/0290241 | A1 | 9/2020 | Gunner et al. | |
| 2021/0236889 | A1 * | 8/2021 | Ling | A63B 53/0466 |

FOREIGN PATENT DOCUMENTS

| | | | |
|---|---|---|---|
| WO | WO 96/21547 | 7/1996 | |
| WO | WO-2013126981 A1 * | 9/2013 | C08J 5/243 |

* cited by examiner

PRODUCTION SYSTEM

RELATED APPLICATIONS

This application is a National Phase of PCT Patent Application No. PCT/TR2022/051226 having International filing date of Nov. 2, 2022, which claims the benefit of priority of Turkey Patent Application No. 2021/021194 filed on Dec. 27, 2021. The contents of the above applications are all incorporated by reference as if fully set forth herein in their entirety.

FIELD AND BACKGROUND OF THE INVENTION

The present invention relates to a production system in which composite material production is carried out.

SUMMARY OF THE INVENTION

In the production of composite parts, a tooling mold or a lay-up tool is generally used as a mold. With the lay-up tool, composite parts with curved surfaces can be produced as well as simple geometric parts with flat forms. In turn, tooling molds can be used for the production of difficult-to-manufacture composite parts with closed and complex geometry, similar to pipes. However, for the tooling molds for composite parts with complex geometry, and for the composite parts with an increasing production in sectors such as aerospace and automotive, the effect of additive (layered) manufacturing applications and three-dimensional printing has been increasing. Especially for the production of composite parts with complex geometry, production with a three-dimensional printer provides the manufacturer with great savings in terms of both cost and time.

The United States patent document U.S. Pat. No. 9,458,955, which is included in the known-state of the art, discloses combined waste and water transport elements that can be designed with various shapes and methods. For the structure produced using a three-dimensional printer, a desired tube shape is given by using a soluble material. The structure having the desired shape can be printed in any diameter, shape or configuration depending on characteristics of the tube and the intended use in the air vehicle. In order to produce a composite material, a composite part is placed outside the 3D printed mold and cured in a furnace or autoclave. After the composite material has cured, 3D printed part is immersed in an acidic solution that dissolves the soluble material. When removed from the bath, only the composite tube remains.

The United States patent document US2020/0290241, which is included in the known-state of the art, discloses the production of panels used in vehicles, boats, airplanes and other mechanical structures. A method for producing a panel for a transport or other mechanical structure comprises applying a material on a surface of a 3D printed tooling shell by using 3D printed tooling shell including a hollow section, and forming the panel from the material using the 3D printed tooling shell as a section of a mold. Another aspect of a method of producing a panel for a transport or other mechanical structure using a three-dimensional (3D) printed tooling shell including a channel to enable resin infusion, vacuum generation, or heat transfer, comprises applying a material on a surface. Using 3D printing in the context of composite molding provides significant flexibility for manufacturers to produce parts with complex geometries that include body panels.

Thanks to a production system according to the present invention, it is possible to save on tool costs, qualified design labor and time required for tool production.

Another object of the present invention is to produce parts with a single curing step for the production of composite parts with eccentric structure, thanks to the production system.

Another object of the present invention is to provide a production system that provides for the production of a simple, easy-to-use and efficient composite part that is produced in a monolithic manner with less cost.

Another object of the present invention is to provide a mold capable of resisting higher autoclave pressures.

The production system realized to achieve the object of the invention, which is defined in the first claim and other claims dependent thereon, comprises a mold produced by an additive manufacturing method; a layer or preform formed by laying resin-impregnated fabrics (prepreg/ply), which are laid on an outer surface of the mold, on top of each other; a vacuum bag placed on the mold so as to cover the outer surface of the mold on which the layer of prepregs is located, wherein the vacuum bag allows the air in the preform/fabrics to be removed at least partially, and allows evacuation of the air and/or resin in the fabric and/or the air between the vacuum bag and the mold; a furnace, which is an autoclave enabling the layer to be cured with temperature and/or pressure and applying temperature and/or pressure to the layer at a temperature and/or pressure value predetermined by a user; a final part obtained by curing the layers on the mold. The number of prepregs may vary according to the usage area of the part predetermined by the user. Fabrics laid on top of each other can be cured together, or they can be cured in parts (for example, 10 plies of fabric and 20 plies of fabric are cured separately). The furnace enables the layer to be cured by applying heat and/or pressure to the mold placed in the furnace and the layer laid thereon. The preform consists of plies laid on the mold before curing. The vacuum bag is used to remove air gaps between resin and fabric or to distribute the resin homogenously or to evacuate the air between each fabric or to evacuate the air between the mold and the fabrics.

The production system according to the invention comprises an additional vacuum bag which surrounds inner wall surface of the mold not contacting the fabric, allowing it to be vacuumed, wherein according to temperature and/or pressure and/or time parameters predetermined by the user, the vacuum bag enables the mold to withstand the pressure inside the furnace to which it is exposed, wherein the vacuum bag enables the mold to be rigid and maintain its form without breaking, and applies pressure to the inner wall of the mold. The additional vacuum bag surrounding the inner wall surface of the mold and the vacuum bag surrounding the outer wall of the mold provide simultaneous vacuuming to the inner wall of the mold and the outer wall of the mold. In this way, since the pressure of the inner wall of the mold and the outer wall of the mold is balanced, the mold placed in the furnace/autoclave can withstand the high-pressure values in the autoclave/furnace predetermined by the user, without breaking. Thanks to the mold that can remain rigid without breaking, the mold and form of the part are substantially preserved. In order to remove the part consisting of the cured layers from the mold, the brittle mold is broken and the part is removed from the mold, so that the final part is obtained.

In an embodiment of the invention, the production system comprises the mold broken along reference directions provided on the mold and determined by the user; and the final part obtained by breaking the mold along the reference directions. Since the mold has a brittle structure and is broken along the reference directions predetermined by the manufacturer, the part can be removed from the mold more easily. The reference directions may extend from one opening on mold wall to another opening on the mold wall. Reference directions may be located almost in the midline of the mold.

In an embodiment of the invention, the production system comprises the mold with a geometric shape predetermined by the user, which is form-fitted with the part, and has a thickness substantially the same as the thickness of the part. The mold is produced by a 3D printer so as to be form-fitted with the geometric shape of the composite part to be produced.

In an embodiment of the invention, the production system comprises the wall which has a greater wall thickness in flat-form areas prone to deformation and collapse, than in other single curvature and/or double curvature areas, thereby absorbing the impacts that the mold will be exposed to. Service life of the mold is extended thanks to the flat areas with greater wall thickness. In addition, thanks to these areas with a greater wall thickness, the mold can be more resistant to the pressure that the inner wall of the mold is exposed to.

In an embodiment of the invention, in the production system, excess and unused sections of the part are removed from the part by means of EOP (edge of part) laser cutting.

Unused sections of the part can also be removed from the part by cutting. Thus, the final part desired to be produced is obtained.

In an embodiment of the invention, the production system comprises the mold having a hollow and/or tubular and/or cylindrical form. Thanks to its hollow geometry, the pressure inside the mold and the pressure outside the mold are balanced with the additional vacuum bag extending from the inner wall of the mold. Thanks to its production with the additive manufacturing method, molds and thus the parts with an eccentric structure can be produced.

In an embodiment of the invention, the production system comprises the mold made of a thermoplastic polyetherimide (PEI) material, which is preferred in terms of mechanical, thermal and electrical properties. Therefore, although the mold has a thin and brittle structure, the part can be shaped without breaking by applying pressure. In addition, it provides easy separation of the cured part from the mold.

In an embodiment of the invention, the production system comprises a mold with a thinner wall thickness than the part. Thus, the pressure exerted by the mold on the part can be greater.

In an embodiment of the invention, in the production system, the single curvature and/or double curvature edges of the mold has a wall thickness greater than the other flat parts. In addition, a support element is provided on the curvature edge to increase the mold strength. Support elements can also be provided on curvature edges where the mold wall thickness is the same or less than the other parts.

In an embodiment of the invention, the production system comprises the additional mold integrated with the mold, which is produced by additive manufacturing method as one piece with the mold; the part produced by a single step without a need for curing to reassemble the mold and the additional mold. Thus, there is no need for curing to re-glue the mold sections consisting of two or more sections. The mold and the additional mold together form the mold.

In an embodiment of the invention, the production system comprises an additional vacuum bag that functions as a single vacuum bag, integral with the vacuum bag. It comprises an additional vacuum bag surrounding inner wall of the mold after the vacuum bag surrounding the outer wall of the mold. In this way, the mold is vacuumed both internally and externally with a single vacuum bag.

In an embodiment of the invention, the production system comprises molds and parts that can be used in air and/or space vehicles. Molds and parts appropriate for aviation and space standards are used.

In an embodiment of the invention, the production system comprises producing the mold by additive manufacturing method; obtaining the layer (laminated/preform) forming the outer wall surface of the mold by laying the fabrics (ply) on the mold; placing the vacuum bag on the layer on the outer wall surface of the mold, wherein the vacuum bag enables the air in the layer to be at least partially evacuated so as to substantially cover the layer, enables the air in the preform/fabrics to be at least partially removed, enables the air and/or resin in the fabric and/or the air between the vacuum bag and the mold to be evacuated, thereby allowing a vacuuming process to be performed; vacuuming the inner wall surface of the mold by the vacuum bag together with an additional vacuum bag; placing the mold and layer in the furnace, which has a temperature and/or pressure value predetermined by the user, for the layer to be cured; keeping the mold rigid without breaking by applying pressure on the wall of the mold during curing or before the layer is cured, by means of the additional vacuum bag; breaking the mold to remove the formed part from the mold after the layer has cured.

BRIEF DESCRIPTION OF THE SEVERAL VIEWS OF THE DRAWING(S)

The production system realized to achieve the object of the present invention is illustrated in the attached drawings, in which.

DESCRIPTION OF SPECIFIC EMBODIMENTS OF THE INVENTION

Figure 1:
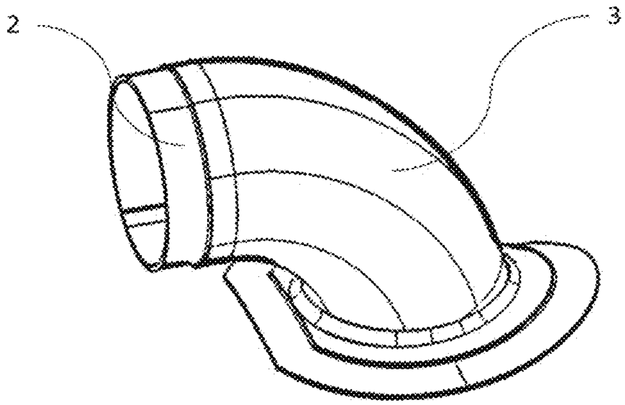
FIG. 1 is an illustration of the mold and layer.
Figure 2:
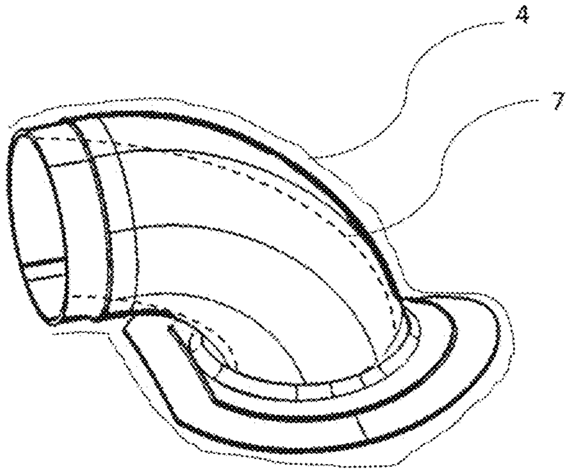
FIG. 2 is a schematic illustration of the production system.
Figure 3:
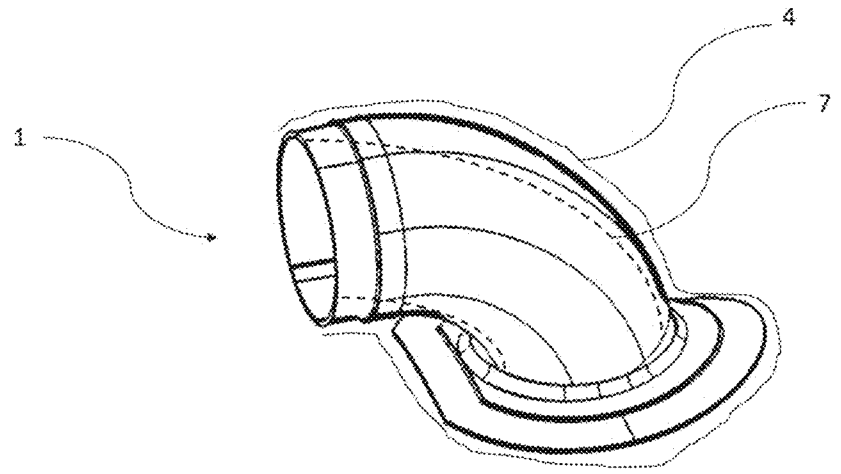
FIG. 3 is a schematic illustration of the production system.

All the parts illustrated in figures are individually assigned a reference numeral and the corresponding terms of these numbers are listed below:

1. Production System
2. Mold
3. Layer
4. Vacuum Bag
5. Furnace
6. Part
7. Additional Vacuum Bag
8. Curvature Edge
9. Support Element
10. Additional Mold
(D) Direction The production system (1) comprises at least one mold (2) produced by additive manufacturing method; at least one layer (3) (laminated) of resin-impregnated fabrics laid on an outer wall surface of the mold (2); at least one vacuum bag (4) which is placed to substantially cover the layer (3) and allows vacuuming; at least one furnace (5) which enables the layer (3) to be cured by heating, applies pressure to the layer (3) at a pressure value predetermined by the user, and into which the mold (2) is placed; at least one part (6) formed by curing the layers (3) (FIG. 1, FIG. 2, FIG. 3).

Figure 4:
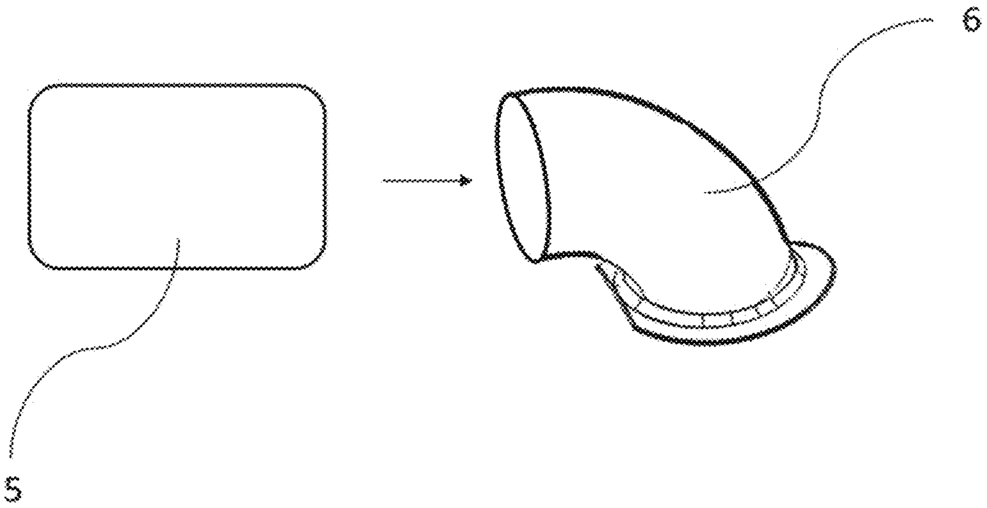
FIG. 4 is an illustration of the part formed after being treated in the furnace.
Figure 5:
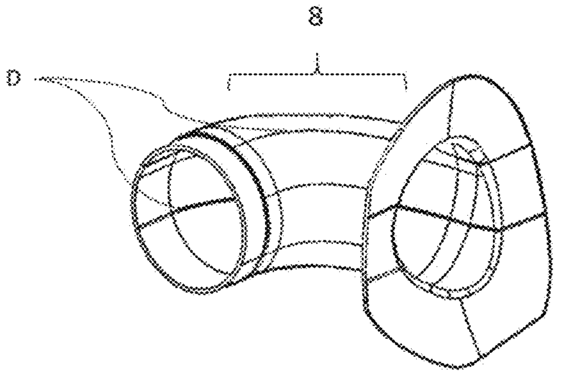
FIG. 5 is a schematic illustration of the production system.
Figure 6:
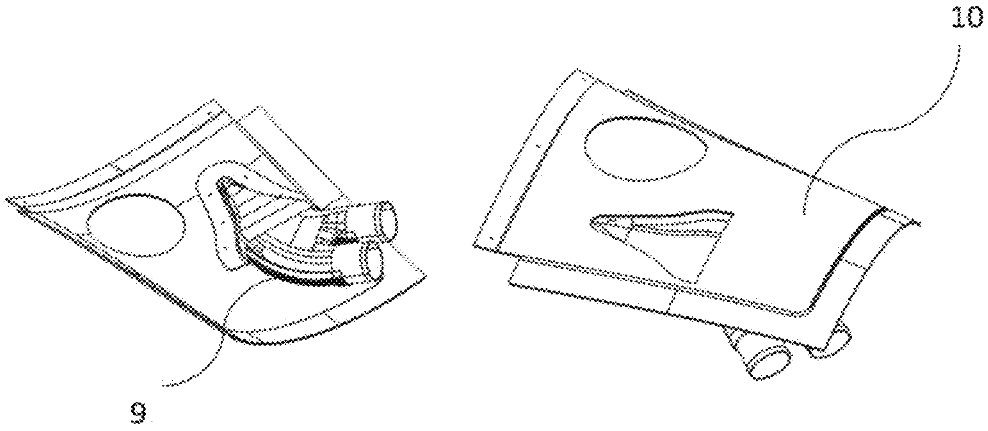
FIG. 6 is a front and rear view of the mold.

The production system (1) according to the invention comprises at least one additional vacuum bag (7) enabling an inner wall surface of the mold (2) to be vacuumed, and allowing the mold (2) to be vacuumed without breaking such that the mold (2) withstands the pressure inside the furnace (5) during a curing process, thereby keeping the mold (2) rigid; the mold (2) which has a brittle structure so as to be removed from the cured part (6), and is removed from the part (6) by the manufacturer by breaking (FIG. 4, FIG. 5, FIG. 6).

The production system (1) comprises at least one mold (2) produced by additive manufacturing method; at least one layer (3) (laminated) of resin-impregnated fabrics (prepreg) and plies (fabric layers) laid on the outer wall of the mold (2); at least one vacuum bag (4) laid on the mold (2) so as to substantially cover the layer (3) on the mold (2) wherein the vacuum bag (4) allows vacuuming to evacuate the air between the layer (3) and/or the ply and/or the air between the mold (2) and the layer (3); at least one furnace (5) which enables the layer (3) to be cured by heating, applies pressure to the layer (3) at a pressure value predetermined by the user in order to shape the layer (3), and into which the mold (2) is placed; at least one part (6) formed by curing the layers (3) in the furnace (5). The preform and/or laminated layer (3) is laid on the outer wall surface of the mold (2), thereby forming the outer wall of the mold (2). Layer (3) consists of plies. The production system (1) comprises the vacuum bag (4) which is located to substantially cover the outer wall surface of the mold (2), and allows vacuuming to evacuate the air between the mold (2) and the layer (3) and/or the excess air in the layer (3) and/or the excess air in the plies and/or to shape the layer (3) and/or to distribute the resin in the layer (3) homogenously.

The production system (1) comprises at least one additional vacuum bag (7) which provides vacuuming of the inner wall surface of the mold (2), extends longitudinally along the inner wall of the mold (2), applies pressure to the mold (2) internally, allows the mold (2) to withstand the pressure it is exposed to in the oven (5) during and/or before curing, and keeps the mold (2) rigid since the mold (2) is vacuumed without breaking even though it has a brittle structure and the pressure inside and outside the mold (2) is balanced. Inner wall of the mold (2) is not in contact with the fabric, ply, layer (3) and the like. The layer (3) is wrapped around the outer surface of the mold (2). Since the outer surface of the mold (2) is vacuumed by the vacuum bag (4) and the inner wall of the mold (2) is vacuumed by the additional vacuum bag (7), internal pressure of the mold (2) and external pressure of the mold (2) are balanced. During a vacuuming process, shape of the mold (2) is substantially preserved. The mold (2) placed in the furnace (5) and the layer (3) surrounding the mold (2) provide the part (6) to be obtained after the curing process. The part (6) obtained is removed from the mold (2) by breaking the thin, brittle mold (2).

In an embodiment of the invention, the production system (1) comprises at least one reference direction (D) predetermined by the manufacturer, which is located on the mold (2) so as to be noticed by the user; the mold (2) which is broken along the reference direction (D) to be removed from the part (6). Since the mold (2) is broken according to the reference direction (D) lines extending from one end of the mold (2) to the other end thereof, the part (6) can be removed from the mold without substantially damaging the part (6). Also, the part (6) can be removed from the mold (2) more easily.

In an embodiment of the invention, the production system (1) comprises the mold (2) which has substantially the same wall thickness as the part (6), is form-fitting with the part (6), and is produced by a 3D printer so as to have a geometric shape predetermined by the user. For the part (6) which has the desired geometric shape to be produced, the mold (2) is produced with a 3D printer so as to be form-fittingly compatible with the part (6). Thanks to the mold (2) having substantially the same thickness as the part (6), the mold (2) exerts more effective pressure on the layer (3) and/or the part (6).

In an embodiment of the invention, the production system (1) comprises the mold (2) which has a greater wall thickness in its flat-form areas than in its single curvature and/or double curvature areas, thus allowing to absorb the impacts to which the mold (2) is exposed. The flat areas of the mold (2), which are more unstable and in need of structural support, have greater wall thickness than the other areas. In this way, the impacts to which flat parts of the mold (2) will be exposed can be absorbed. Mold (2) strength is increased.

In an embodiment of the invention, the production system (1) comprises the part (6) obtained by removing excess edge of parts (6) (EOP) from the part (6) by laser cutting. For the final part (6) obtained, the excess EOP (edge of part) areas on the part (6) are removed from the part (6) by cutting and/or by laser cutting.

In an embodiment of the invention, the production system (1) comprises the mold (2) having at least partially a hollow geometry and/or at least partially a cylindrical geometry. The production system (1) comprises the mold (2) having a hollow and/or cylindrical geometry, with one open end and/or at least one open end. Therefore, the parts (6) with eccentric geometrical shapes having this form can be vacuumed both internally and externally.

In an embodiment of the invention, the production system (1) comprises the mold (2) made of a thermoplastic polyetherimide material such as Ultem. The mold (2) can be used, which is a thermoplastic and/or thermoset material with a thin and brittle structure that can withstand high temperature values.

In an embodiment of the invention, the production system (1) comprises the mold (2) having a thinner wall thickness than the part (6), thus applying more effective pressure on the part (6). Because the mold (2) has a thinner form than the part (6) and/or the layer (3), the mold (2) applies more effective pressure to the part (6) and/or the layer (3) by means of the vacuum bag (4) and the additional vacuum bag (7).

In an embodiment of the invention, the production system (1) comprises at least one curvature edge (8) with a wall thickness greater than the flat areas of the mold (2), and which allows to absorb the impacts to which the mold (2) is exposed; at least one support element (9) located on the curvature edge (8) and increasing the strength of the mold (2). Since the curvature edges (8) on the mold (2) are exposed to impacts, the mold (2) strength is increased by the support element (9).

In an embodiment of the invention, the production system (1) comprises at least one additional mold (10) produced integrally with the mold (2); the part (6) produced integrally with a single curing step without requiring an additional curing step to assemble the mold (2) and the additional mold (10). In order to assemble the mold (2) and the additional mold (10), which have a complex geometry, a curing step is required again in the furnace (5). However, thanks to the mold (2) and the additional mold (10), which are produced integrally by the additive manufacturing method, a solid part (6) is obtained without requiring an additional curing step in the furnace (5).

In an embodiment of the invention, the production system (1) comprises the additional vacuum bag (7) integral with the vacuum bag (4). Thus, vacuuming is provided with a single vacuum bag (4).

In an embodiment of the invention, the production system (1) comprises the mold (2) and the part (6) suitable for use in air and/or space vehicles. In this way, material selection can be made in accordance with flight standards.

In an embodiment of the invention, the production system (1) comprises the part (6) which is produced by:

producing the mold (2) by additive manufacturing method;

obtaining the layer (3) (laminated) forming the outer wall surface of the mold (2) by laying the fabrics on the mold (2);

placing the vacuum bag (4) on the layer (3), wherein the vacuum bag (4) allows vacuuming by substantially covering the layer (3);

vacuuming the inner wall surface of the mold (2) by the additional vacuum bag (7);

placing the mold (2) and layer (3) in the furnace (5), which has a temperature and/or pressure value predetermined by the user;

applying pressure on the wall of the mold (2) during curing by means of the additional vacuum bag (7), so that the mold (2) is kept rigid without breaking;

breaking the mold (2) to remove the part (6) from the mold (2). The part (6) is produced by:

producing the mold (2) by additive manufacturing method;

obtaining the layer (3) (laminated) forming the outer wall surface of the mold (2) by laying the plies on the mold (2);

placing the vacuum bag (4) on the layer (3), wherein the vacuum bag (4) allows vacuuming to the outer wall of the mold (2) so as to substantially cover the layer (3);

vacuuming the inner wall surface of the mold (2) substantially simultaneously with the outer wall surface of the mold (2) by means of the additional vacuum bag (7);

placing the mold (2) and layer (3) in the furnace (5), which has a temperature and/or pressure value predetermined by the user, and curing the layer (3);

applying pressure on the wall of the mold (2) during curing by means of the additional vacuum bag (7), so that the mold (2) is kept rigid without breaking;

breaking the mold (2) to remove the part (6) from the mold (2).

The invention claimed is:

1. A production system for forming a part, comprising:

at least one mold produced by additive manufacturing method;

at least one layer of resin-impregnated fabrics laid on an outer wall surface of the mold;

at least one vacuum bag which is placed to substantially cover the at least one layer and allows vacuuming;

at least one furnace which enables the at least one layer to be cured by heating, applies pressure to the at least one layer at a pressure value predetermined by a user, and into which the mold is placed;

at least one part formed by curing the at least one layer;

at least one additional vacuum bag enabling an inner wall surface of the mold to be vacuumed, and allowing the mold to be vacuumed without breaking such that the mold withstands a pressure inside the at least one furnace during a curing process, thereby keeping the mold rigid; the mold being configured to be removed from the cured part by breaking, the mold comprising at least one reference direction line predetermined by a manufacturer, located on the mold in a manner perceivable by the user, and extending longitudinally from one end of the mold to another end thereof, wherein the mold is broken along the at least one reference direction line to separate the part from the mold substantially without damaging the part, and to allow the part to be removed from the mold more easily.

2. A production system according to claim 1, wherein the mold has substantially the same wall thickness as the part, is form-fitting with the part, and is produced by a 3D printer so as to have a geometric shape predetermined by the user.

3. A production system according to claim 1, wherein the mold has a greater wall thickness in flat-form areas thereof than in single curvature and/or double curvature areas thereof, thus allowing absorption of impacts to which the mold is exposed.

4. A production system according to claim 1, wherein the part is obtained by removing excess edge of parts from the part by laser cutting.

5. A production system according to claim 1, wherein the mold has at least partially a hollow geometry and/or at least partially a cylindrical geometry.

6. A production system according to claim 1, wherein the mold is made of a thermoplastic polyetherimide material.

7. A production system according to claim 1, wherein the mold has a thinner wall thickness than the part, thus applying more effective pressure on the part.

8. A production system according to claim 1, wherein the mold includes different areas comprising flat areas and at least one curvature edge, the at least one curvature edge having a wall thickness greater than that of the flat areas of the mold, and allowing absorption of impacts to which the mold is exposed; and at least one support element located on the at least one curvature edge and increasing strength of the mold.

9. A production system according to claim 1, further comprising at least one additional mold produced integrally with the mold; the part produced integrally with a single curing step without requiring an additional curing step to assemble the mold and the additional mold.

10. A production system according to claim 1, wherein the additional vacuum bag is integral with the vacuum bag.

11. A production system according to claim 1, wherein the mold and the part are suitable for use in air and/or space vehicles.

12. A production system according to claim 1, wherein the at least one part is produced by:

producing the at least one mold by the additive manufacturing method;

laying the resin-impregnated fabrics on the outer wall surface of the at least one mold to form the at least one layer; placing the at least one vacuum bag to substantially cover the at least one layer; vacuuming the inner wall surface of the at least one mold by the at least one additional vacuum bag;

placing the at least one mold and the at least one layer in the at least one furnace; and applying pressure on a wall of the at least one mold during curing by means of the at least one additional vacuum bag, so that the at least one mold is kept rigid.

* * * * *